US012773854B2

(12) United States Patent
Kueckendahl et al.

(10) Patent No.: US 12,773,854 B2
(45) **Date of Patent: *Oct. 27, 2026**

(54) SYSTEM AND METHOD FOR LASER MARKING SUBSTRATES

(71) Applicant: Alltec Angewandte Laserlicht Technologie GmbH, Selmsdorf (DE)

(72) Inventors: Peter J. Kueckendahl, Bad Oldesloe (DE); Daniel J. Ryan, Sycamore, IL (US)

(73) Assignee: Alltec Angewandte Laserlicht Technologie GmbH, Selmsdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/519,159

(22) Filed: Nov. 4, 2021

(65) Prior Publication Data

US 2022/0055374 A1 Feb. 24, 2022

Related U.S. Application Data

(63) Continuation of application No. 16/465,917, filed as application No. PCT/US2017/064115 on Dec. 1, 2017, now Pat. No. 11,192,389.

(Continued)

(51) Int. Cl.
*B41J 2/44* (2006.01)
*B41J 2/455* (2006.01)
(Continued)

(52) U.S. Cl.
CPC ............... *B41J 2/465* (2013.01); *B41J 2/442* (2013.01); *B41J 2/455* (2013.01); *B41J 2/47* (2013.01);
(Continued)

(58) Field of Classification Search
CPC ... B41J 2/442; B41J 2/465; B41J 2/471; B41J 2/4753; B41J 2/48; B41M 5/0035; B41M 5/36
See application file for complete search history.

(56) References Cited

U.S. PATENT DOCUMENTS 6,043,453 A * 3/2000 Arai .................. B23K 26/0738 219/121.73
9,023,461 B2 5/2015 Brookhyser et al.
(Continued)

FOREIGN PATENT DOCUMENTS

CN 204712648 U 10/2015

OTHER PUBLICATIONS

PCT/US2017/064115 International Search Report and Written Opinion, dated Mar. 8, 2018, 15 pages.

*Primary Examiner* — Douglas X Rodriguez
*Assistant Examiner* — Kendrick X Liu
(74) *Attorney, Agent, or Firm* — DeLizio, Peacock, Lewin & Guerra LLP

(57) ABSTRACT

A laser marking system comprises at least one controller to control an array of optical devices, between a laser source and a scan head. The array applies a selected pattern of portions of the received spatial profile of the laser beam to the substrate to achieve a second intensity different from the first intensity of laser beam at a rate of power deposition relative to a rate of thermal diffusion in the substrate for a predetermined time interval to thermally heat locations of the substrate with the selected pattern of the portions. The second intensity effectuates carbonization of materials of the substrate to create a mark without ablation.

19 Claims, 14 Drawing Sheets

Related U.S. Application Data

(60) Provisional application No. 62/429,164, filed on Dec. 2, 2016.

(51) Int. Cl.

| | |
|---|---|
| ***B41J 2/465*** | (2006.01) |
| ***B41J 2/47*** | (2006.01) |
| ***B41J 2/475*** | (2006.01) |
| ***B41J 2/48*** | (2006.01) |
| ***B41M 5/00*** | (2006.01) |
| ***B41M 5/24*** | (2006.01) |
| ***B41M 5/36*** | (2006.01) |

(52) U.S. Cl.

CPC ............. *B41J 2/471* (2013.01); *B41J 2/4753* (2013.01); *B41J 2/48* (2013.01); *B41M 5/0035* (2013.01); *B41M 5/24* (2013.01); *B41M 5/36* (2013.01)

(56) References Cited

U.S. PATENT DOCUMENTS

| | | | | |
|---|---|---|---|---|
| 9,570,874 | B1 | 2/2017 | Ghauri et al. | |
| 11,192,389 | B2 * | 12/2021 | Kueckendahl | B41J 2/442 |
| 2002/0179580 | A1 | 12/2002 | Costin | |
| 2007/0070361 | A1 * | 3/2007 | Morizono | B41J 2/465 358/1.4 |
| 2007/0173039 | A1 | 7/2007 | Tagusa | |
| 2008/0128493 | A1 * | 6/2008 | Jones | B41M 5/24 428/29 |
| 2010/0039694 | A1 * | 2/2010 | Wagener | G02B 26/02 359/290 |
| 2010/0054287 | A1 | 3/2010 | Ghauri | |
| 2010/0315568 | A1 * | 12/2010 | Chien | G02F 1/1395 349/33 |
| 2011/0102537 | A1 | 5/2011 | Griffin et al. | |
| 2011/0292157 | A1 | 12/2011 | Ghauri | |
| 2012/0043306 | A1 | 2/2012 | Howerton et al. | |
| 2013/0021422 | A1 * | 1/2013 | Chen | B44C 1/02 347/197 |
| 2015/0210085 | A1 | 7/2015 | Ghauri | |
| 2015/0365577 | A1 * | 12/2015 | Watnik | G02B 27/0025 348/36 |
| 2016/0052293 | A1 * | 2/2016 | Seshaiya Doraiswamy Chandrasekar | B41J 2/4753 347/175 |
| 2019/0001434 | A1 * | 1/2019 | Liu | B23K 26/082 |
| 2019/0001442 | A1 * | 1/2019 | Unrath | B23K 26/0622 |
| 2021/0001653 | A1 * | 1/2021 | Seshaiya Doraiswamy Chandrasekar | B41M 5/26 |

* cited by examiner

500

600

728

900

1000

1000A

1100B

1200

SYSTEM AND METHOD FOR LASER MARKING SUBSTRATES

BACKGROUND OF THE INVENTION

Embodiments herein relate to generally laser marking systems and methods and more particularly to such systems and methods that are used to mark paper substrates.

The marking of paper based products and packaging is typically accomplished by ablating a layer of material, i.e. ink, to expose an underlying layer of a different color thereby providing contrast. This process does not require finesse by the operator. One only needs to make sure there is sufficient laser energy to remove the top layer and not too much energy to keep from burning through the subsequent layers. Thus, the operator determines the threshold power or energy needed for ablation and ensures that the laser printer operates above that threshold.

However, there are substrate materials that do not have distinguishable sublayers that allow for ablation of one of the individual layers. In these cases, marking is accomplished by a color change that is induced by a chemical reaction stimulated by the laser energy. White printer paper is just such a substrate. Using a standard CO2 laser marking system to mark white copier paper will produce an ablated mark that is light brown in color and has poor contrast. Such marks are generally not acceptable to the user. In most cases, increasing the laser power/energy makes the mark lighter and reduces the contrast, just the opposite of the desired effect. Because ablation removes the surface material, the only visible indication of a mark is from the ends of the paper fibers from which the burned portions are vaporized and the yellowed lignin binder.

Paper is a multicomponent substrate composed of a mixture of paper fiber (cellulose) or pulp, a binder (lignin), processing chemicals, colorants, fillers, and finishing chemicals. These chemicals are a mixture of natural and synthetic materials. One way to induce a color change in paper is through carbonization of the fiber or binder without subsequent vaporization of the fiber or binder. Carbonization occurs in a narrow temperature range that is material dependent. Common copier paper will carbonize in the temperature range of 200-250° C. The technical challenge is how to spatially and temporally control the temperature of the paper in such a way that the carbonization creates the desired printed image. Further, by melting the binder and not vaporizing it, the molten binder encases any carbonization formed on the surface thereby enhancing the durability of the print. To date, laser marking systems and methods typically do not effectively control the temperature of the paper to create an image without vaporizing the binder. Accordingly, the burnt paper fiber is exposed causing the image to be susceptible to smudging.

SUMMARY OF THE INVENTION

The embodiments encompass the method(s) and system for depositing laser energy in such a manner as to raise the substrate to the proper carbonization temperature and at the same time minimize the area of heating to create the desired spot size.

An aspect of the embodiments includes a method of laser marking a substrate including positioning a substrate relative to a scan head of a laser marking system having a laser source that generates a laser beam of predetermined power and predetermined duration; and producing a laser beam having a first intensity. The method includes controlling, by at least one controller, an array of optical devices, between the laser source and the scan head, to apply a selected pattern of portions of the received spatial profile of the laser beam to the substrate to achieve a second intensity different from the first intensity of laser beam at a rate of power deposition relative to a rate of thermal diffusion in the substrate for a predetermined time interval to thermally heat locations of the substrate with the selected pattern of the portions. The second intensity effectuates carbonization of materials of the substrate without ablation to create a mark.

Embodiments of the method may further include controlling a laser beam pulse shape by providing a laser beam modulator device between the laser beam source and the scan head and controlling the laser beam modulator device to control one or more laser pulse characteristics associated with the laser beam pulse shape. The laser beam pulse characteristics may comprise peak intensity, pulse width, fall time and rise time.

Another aspect of the embodiments includes a laser marking system having a scan head for marking a substrate via carbonization of components of the substrate, comprising: a laser source that generates a laser beam of predetermined power, first spatial profile and predetermined duration. The system includes a means for producing a laser beam having a first intensity and a received spatial profile; and an array of optical devices between the laser source. At least one controller controls the array of optical devices, between the laser source and the scan head, to apply a selected pattern of portions of the received spatial profile of the laser beam to the substrate to achieve a second intensity different from the first intensity of laser beam at a rate of power deposition relative to a rate of thermal diffusion in the substrate for a predetermined time interval to thermally heat locations of the substrate with the selected pattern of the portions wherein the second intensity effectuates carbonization of materials of the substrate to create a mark

BRIEF DESCRIPTION OF DRAWINGS

A more particular description briefly stated above will be rendered by reference to specific embodiments thereof that are illustrated in the appended drawings.

Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
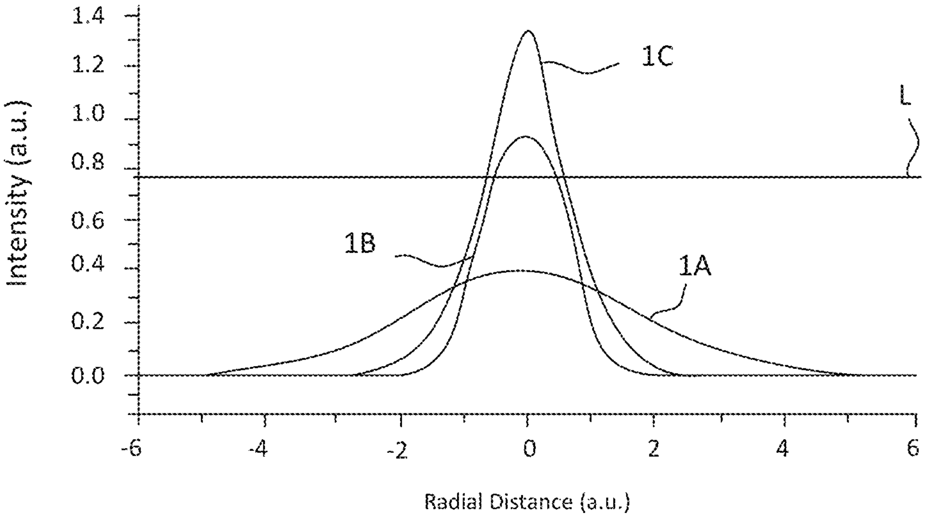
FIG. 1 illustrates a graphical display of Gaussian laser beam pulses.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The inventors of embodiments of the invention have determined that by controlling a rate of power deposition of a laser beam at a paper substrate to achieve a predetermined intensity of a laser energy pulse, the paper substrate can be effectively marked by carbonization of paper material without carbonizing a resin material of the paper substrate. The term "paper" or "paper substrate" as used herein means any substrate composed of a cellulose material and a binding agent such as a resin, among other constituents. Accordingly, a paper substrate may include, for example, a sheet of paper or thicker paper such as cardboard packaging. The term "paper material" as used herein is intended to refer to the cellulosic material of the paper substrate. Note, while examples of embodiments described herein may refer to a paper substrate, the embodiments are not so limited, and the invention may cover carbonizing substrates other than paper substrates. That is, by controlling the rate of power deposition of a laser beam as described herein, materials of a substrate may be effectively carbonized to generate an image without deleteriously affecting the image or substrate. The specific application to carbonization of paper for printing with the precise specification of laser parameters is considered novel, at least to these inventors.

FIG. 1 illustrates a graphical display of Gaussian laser beam pulses. For example, with respect to FIG. 1, three Gaussian laser pulses are graphically illustrated with radial distance in arbitrary units (a.u.) on the horizontal axis and intensity in arbitrary unit (a.u.) on the vertical axis. The line L represents the threshold intensity in arbitrary units (a.u.) required for carbonization of the substrate. Pulse 1A has the same amount energy in the pulse as in 1B and 1C but is lower in intensity and a longer pulse width. This laser pulse never reaches the threshold for carbonization and will not mark. Pulse 1C has excessive intensity and would likely vaporize the material leaving a light brown mark. Pulse 1B has an intensity just exceeding the threshold for carbonization and will leave the desired mark.

Figure 2:
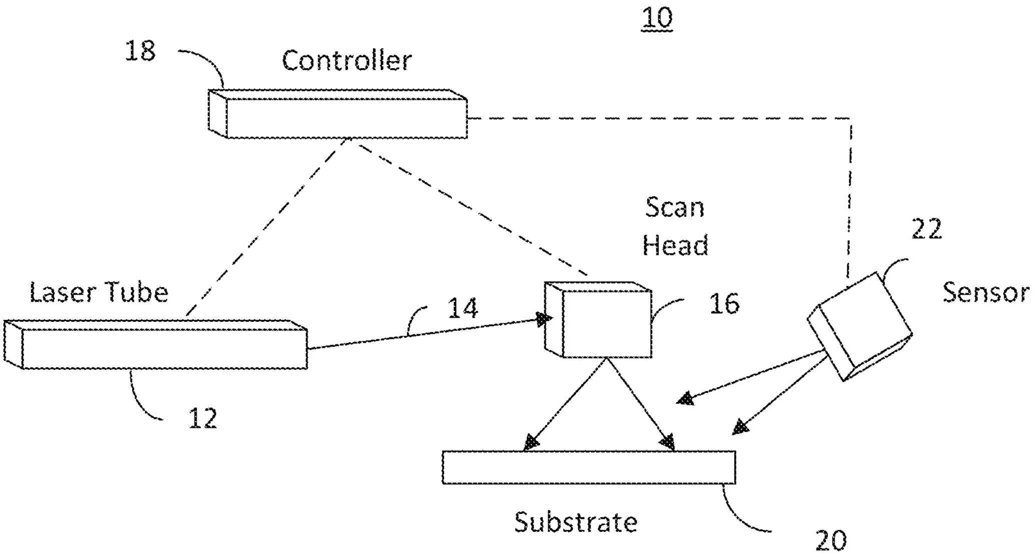
FIG. 2 illustrates a schematic of a laser marking system with sensors.

FIG. 2 illustrates a schematic of a laser marking system 10 with at least one sensor 22. The laser marking system 10 directly controls the laser energy emitted from the laser without using any additional external optical devices.

The process of laser heating of a substrate is well known. Thus, the inventors have discovered that laser heating of different substrates can be analytically modeled. The laser illuminates the substrate with a defined amount of power for a set amount of time. Some of this energy (power X time) is absorbed by the substrate and converted to heat. The temperature rise is determined by the rate of power deposition and the rate of thermal diffusion in the substrate by thermal conductivity. A metal substrate requires a high peak power pulse delivered in a short time period to raise the temperature before the high thermal conductivity of the metal diffuses the laser energy. Paper, on the other hand, needs very little power in a longer period of time due to the relatively long diffusion time.

The laser marking system 10 may include a laser source 12 for generating a laser beam 14 that is transmitted to a scan head 16. A controller 18 is provided in signal communication with the laser source 12 and scan head 16. The scan head 16 includes galvanometric mirrors and focused optics (not shown) to control the beam path of the laser beam 14 toward a paper substrate 20 for power deposition within a marking field of the paper substrate 20.

The system 10 may also include a sensor 22, such as a machine vision system that may detect a mark generated on the substrate 20. For example, the sensor 22 may detect the color contrast between a generated mark and portions of the substrate not marked. The sensor 22 is in signal communication with the controller 18, which may include a memory device and may be programmed to compare a detected parameter of a mark to stored data relative to a predetermined threshold contrast parameter or range of a desired contrast. To the extent the detected contrast is above or below a desired threshold or not within a preferred range, the controller 18 is in signal communication with the laser source 12 to adjust the above-referenced pulse parameters to control the rate of laser energy deposition at the substrate 20. The contrast is a carbonization contrast level.

The controller 18 of the system 10 may be programmed to compare a detected or measured color contrast to lower and upper contrast thresholds, and transmit signals in response to a detected contrast above or below the thresholds. The system 10 is configured to heat the substrate in iteratively until carbonization is effectuated on the substrate without ablation and with a desired carbonization contrast level.

In summary, the laser marking system 10 drives the laser with the specific pulse characteristics of peak power, pulse width, and rise time to achieve the desired marking results. The pulse characteristics would be defined specifically for different types of paper or substrates.

Since, the laser beam from the laser source can be directly controlled for macro-pulse shaping modifications, then an external optical device (external to the laser source) may be used to perform micro-pulse shaping. Such an optical device would be used to adjust the peak power, pulse width, fall time and rise time of the input laser beam. By way of non-limiting example, the optical devices may be transmissive, refractive or reflective and could be in the form of an electro-optic (EO) modulator, an acousto-optic (AO) modulator, a spatial-light-modulator (SLM), or a metamaterial modulator (MM). Another beam modulator may include a liquid crystal (LC) modulator. Possible implementations are shown in FIGS. 3 and 4.

Figure 3:
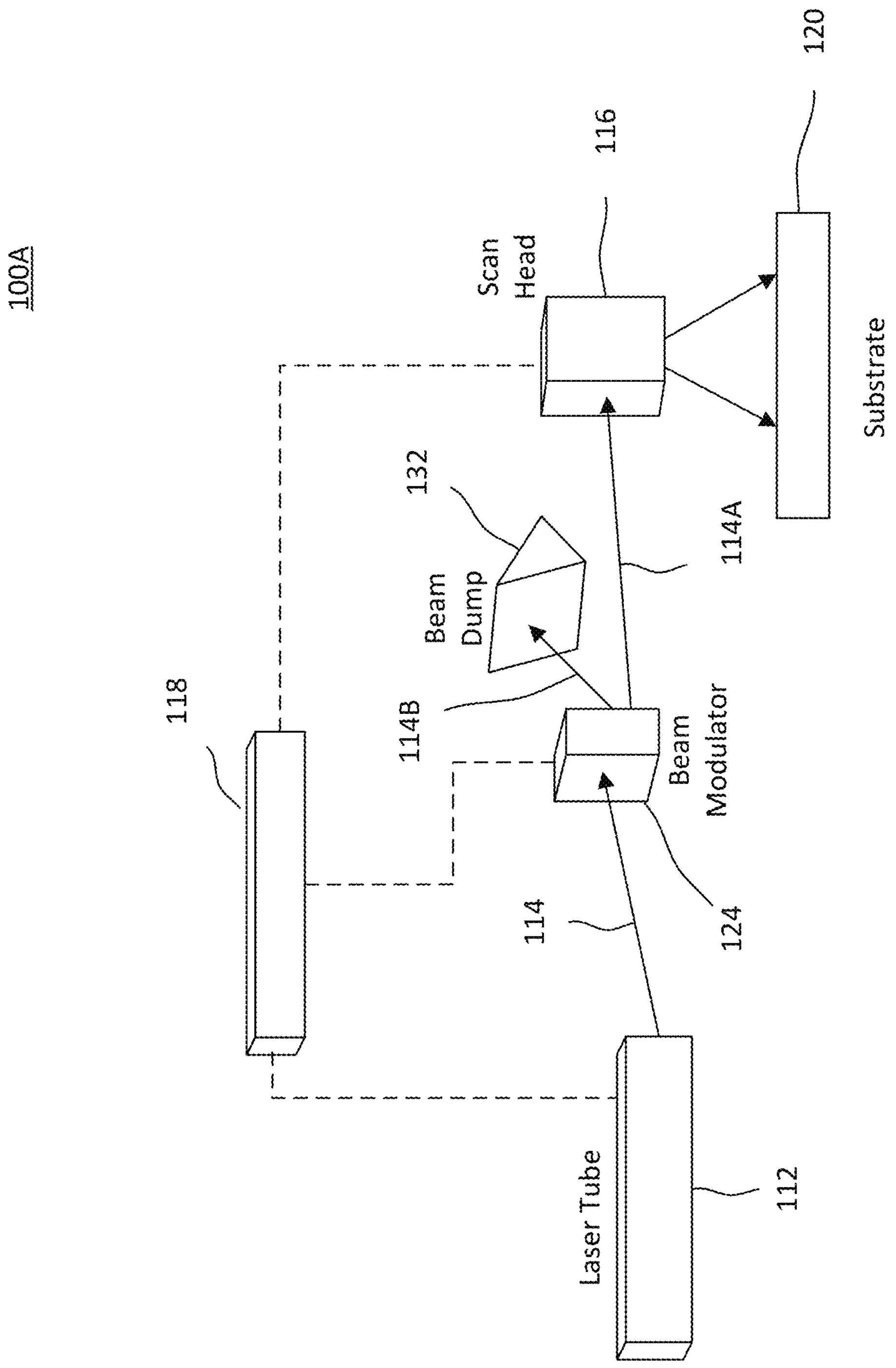
FIG. 3 illustrates a block diagram of a laser marking system including a transmissive implementation of a pulse shape modulator or beam modulator.
Figure 4:
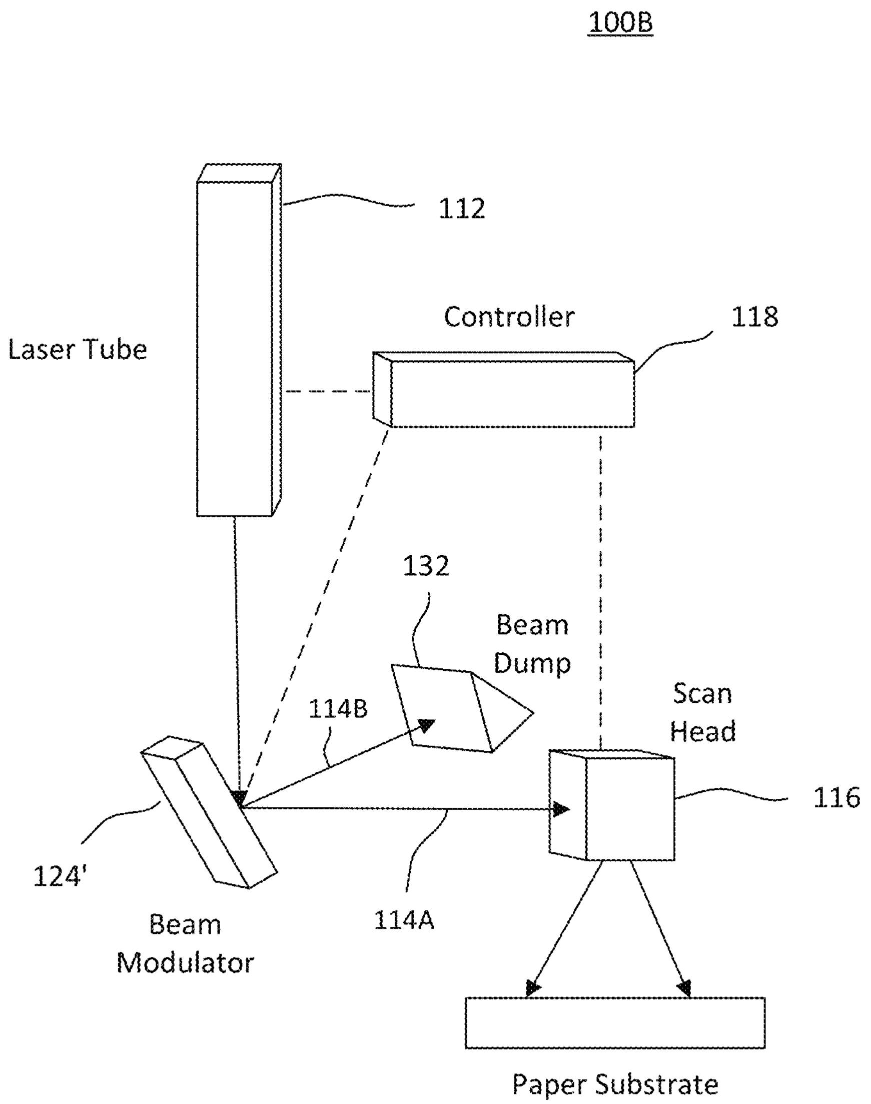
FIG. 4 illustrates a block diagram of a laser marking system including a reflective implementation of a pulse shape modulator or beam modulator.

FIG. 3 illustrates a block diagram of a laser marking system 100A including a transmissive implementation of a pulse shape modulator or beam modulator 124. FIG. 4 illustrates a block diagram of a laser marking system 100B including a reflective implementation of a pulse shape modulator or beam modulator 124'. In the embodiments shown in FIGS. 3 and 4, the laser marking systems 100A, 100B include a laser source 112 configured to produce a laser beam 114. The laser source 112 is coupled to controller 118 or computing device to control parameters of the laser beam 114. By way of non-limiting example, the laser source 112 may control the pulse width, output rate, fall time and rise time of the laser beam. In other words, the laser source 112 is controlled to perform macro-pulse shaping modifications to produce a mark.

The laser source 112 described herein with respect to any of the disclosed embodiments may be comprised of a Quasi-Continuous Wave laser (having a laser output of constant power but variable and controllable duration); a super-pulsed laser (having a moderately high power and shorter, controllable duration and limited pulse frequency); or a Q-Switched laser (having very high peak powers, very short duration, and variable pulse frequency). Other laser sources may be considered.

The laser source may be a gas laser such as CO2, or a solid-state laser such as a YAG, or may include a diode laser or other semiconductor type lasers, or may include fiber lasers. Light may be emitted within a wavelength range of 0.3 microns to about 20 microns, and preferably from about 9.0 microns to about 11 microns.

The laser marking system 100A and 100B includes pulse shaping modulators 124, 124' configured to control the rate of laser power deposition at the substrate 120 by reflecting, refracting or diffracting first portions 114A of the laser beam 114 to the scan head 116 and second portions 114B of the laser beam to a laser beam absorbing device 132, such as, without limitation, a carbon block or black anodized tube. The pulse shape modulator or beam modulator 124, 124' may be controlled by controller 118 or a computing device, as will be described in more detail in relation to FIGS. 10, 13A-13C and 14. The computing device is described in detail in relation to FIG. 15. In some embodiments, refracting optical elements may be substituted with diffracting optical elements to change a direction of the laser beam.

For the purposes of this invention, a modulator is defined to be a material that when stimulated by an external signal, changes one or more of its material properties such that a beam of light impinging upon the material has its magnitude and/or phase modified. The preferred stimulus signal would be an electronic signal but may also be a light stimulus, a thermal stimulus, an acoustic stimulus, or other types of electromagnetic stimuli. The material properties that may be changed would include; permittivity, permeability, conductivity, polarizability, or crystallinity for example. In the preferred embodiment, the magnitude of the change and the rate of change would be controllable by the stimulus signal. The control of the magnitude of change allows for the control of the magnitude, i.e. attenuation, of the light reflected/transmitted from/through the material. In a similar manner, the control of the rate of change of the material properties allows for the control of the rise time and fall time of the change in magnitude of the impinging light beam.

The modulator 124 or 124' may be comprised of a single piece of material or it may be comprised of an array of individually controlled pieces (pixels) of material. The single piece would interact with the entire width of the beam and operate uniformly on the entire beam of light. Conversely, the array of pixels would each operate on small portions of the beam, denoted here as beamlets. Each beamlet would have its magnitude and phase (relative to the adjoining pixels) modified such that the composite beam reflected/transmitted from/through the material now comprises an image or pattern.

The pulse shaping modulator device may include a MOEM (micro-optical-electro-mechanical) device. The MOEM may include micro-mirror arrays (optical elements) such as the Texas Instruments® Digital Micromirror Device (DMD). The pixel size of each optical element is much smaller than the incoming beam diameter. The optical elements may be reflective optical devices. The optical elements may include a combination of micro-optics and MEM (micro-electro-mechanical) devices.

The pulse shaping modulator device may include a SLM (spatial-light-modulator). The SLM may include Individually addressable pixels (optical elements) configured to be transmissive (Liquid Crystal) or reflective (LCOS—Liquid crystal on silicon). The optical elements can control the magnitude and/or phase of the impinging light.

The pulse shaping modulator device may include EO (electro-optic) elements. The EO elements may include a crystal material that when stimulated by an electric field, uses polarization to attenuate the laser beam.

The pulse shaping modulator device may include AO (acousto-optic) elements. The AO elements may include a crystal material that uses an acoustic stimulus to change the refractive index of the crystal thereby modifying the magnitude and phase of the laser beam. The magnitude change may include on, off or other intermediate magnitudes through attenuation between on (full magnitude impinging the material) and off (zero magnitude).

The pulse shaping modulator device may include LC (liquid crystal) optical elements. Liquid crystal properties of the optical element may be configured to change polarizability under stimulation. A single device would attenuate a reflected/transmitted beam. An array of liquid crystals may change the magnitude and phase of a reflected/transmitted or refracted beam thereby creating the desired pattern.

The pulse shaping modulator device may include PCM (phase change material) optical elements. PCM includes a broad class of materials that undergo a phase change (metal/insulator, crystal/amorphous, for example) that could be used to modify the magnitude of an entire beam or magnitude and phase of beamlets. An example would be a Vanadium oxide compound commonly found in thermal windows, or graphene.

The pulse shaping modulator device may include optical elements made of metamaterials. Metamaterials are man-made materials that have material properties not found in natural materials. Metamaterials may be bulk or surface materials and may be comprised of some of the above technologies. For example, a micro-structured surface layer on an optical device such as a lens could contain a layer of graphene sandwiched between two thin but optically transmissive and conductive layers. By applying a voltage across the graphene layer, the transmission through or reflectivity from the optical device may be controlled.

Figure 13A:
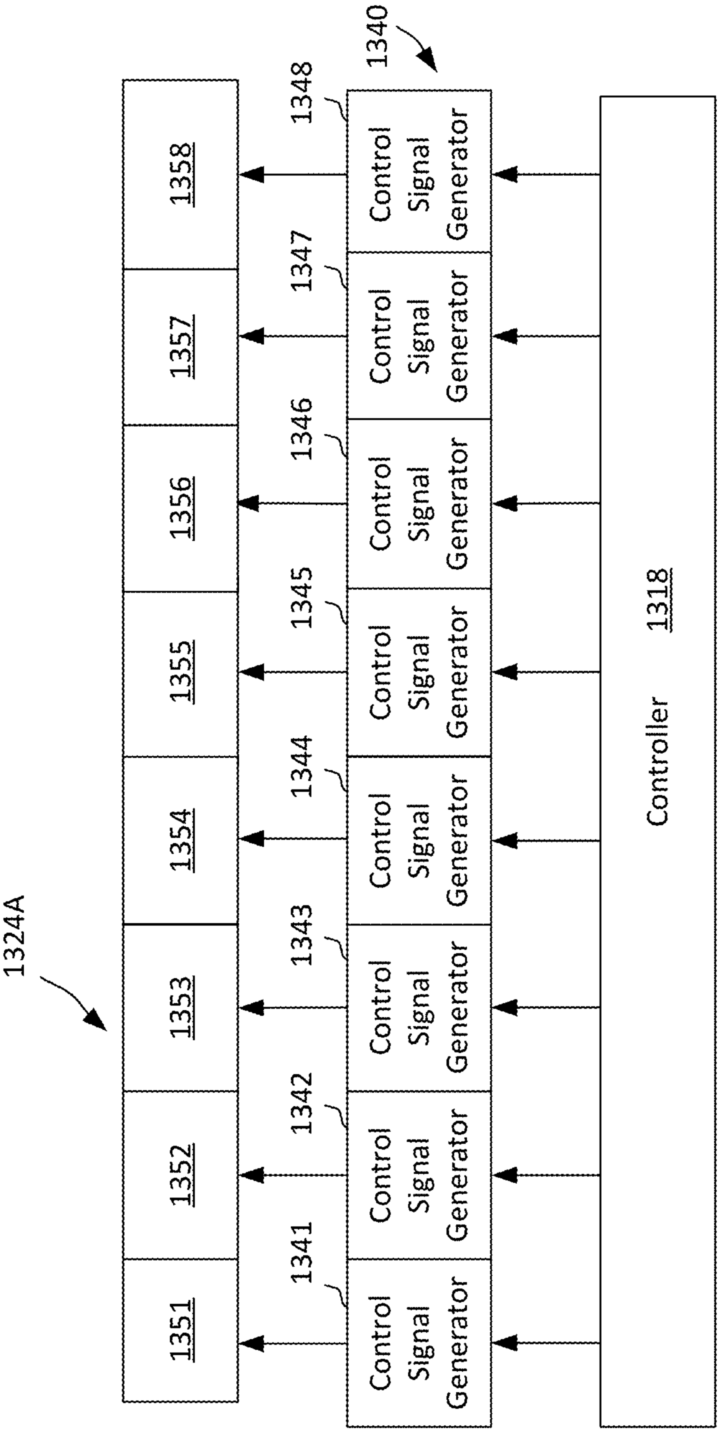
FIG. 13A illustrates a block diagram of a pulse shaping modulator with an array of transmissive optical elements.

FIG. 13A illustrates a block diagram of a pulse shaping modulator 1324 with an array of transmissive optical elements 1351, 1352, 1353, 1354, 1355, 1356, 1357, and 1358. The array of transmissive optical elements includes 8 elements. However, this is for illustrative purposes. The array of transmissive elements may have any number of elements including but not limited to tens of optical elements, hundreds of optical elements or thousands of optical elements.

The array of transmissive optical elements 1351, 1352, 1353, 1354, 1355, 1356, 1357, and 1358 are each individually controllable via controller 1318. The controller 1318 may be coupled to control signal generators (CSG) 1341, 1342, 1343, 1344, 1345, 1346, 1347, and 1348. Each respective one CSG 1341, 1342, 1343, 1344, 1345, 1346, 1347, and 1348 may be responsive to a control signal or electronic signal from controller 1318. The CSG 1341, 1342, 1343, 1344, 1345, 1346, 1347, and 1348 may generate one of an electronic signal, a light stimulus, a thermal stimulus, an acoustic stimulus, other types of electromagnetic stimuli or other control signal to control at least one optical property of the transmissive optical elements 1351, 1352, 1353, 1354, 1355, 1356, 1357, and 1358 to which a corresponding one CSG is coupled. An optical property may include a change in a physical property or a material property. A physical property may include tilting the optical element. The material properties may include: permittivity, permeability, conductivity, polarizability, or crystallinity for example. In some embodiments, the magnitude of the change and the rate of change would be controllable by the stimulus signal. The control of the magnitude of the intensity of the laser beam or beamlets may be controlled by attenuation of the light reflected, refracted or transmitted from/through the material.

In some embodiments, the transmissive optical elements 1351, 1352, 1353, 1354, 1355, 1356, 1357, and 1358 may be controlled to change both an optical property and a physical property. For example, an off transmissive optical element may direct the laser beam impinging thereon to a beam absorber 832 for absorption of the that portion of the laser intensity.

Figure 13B:
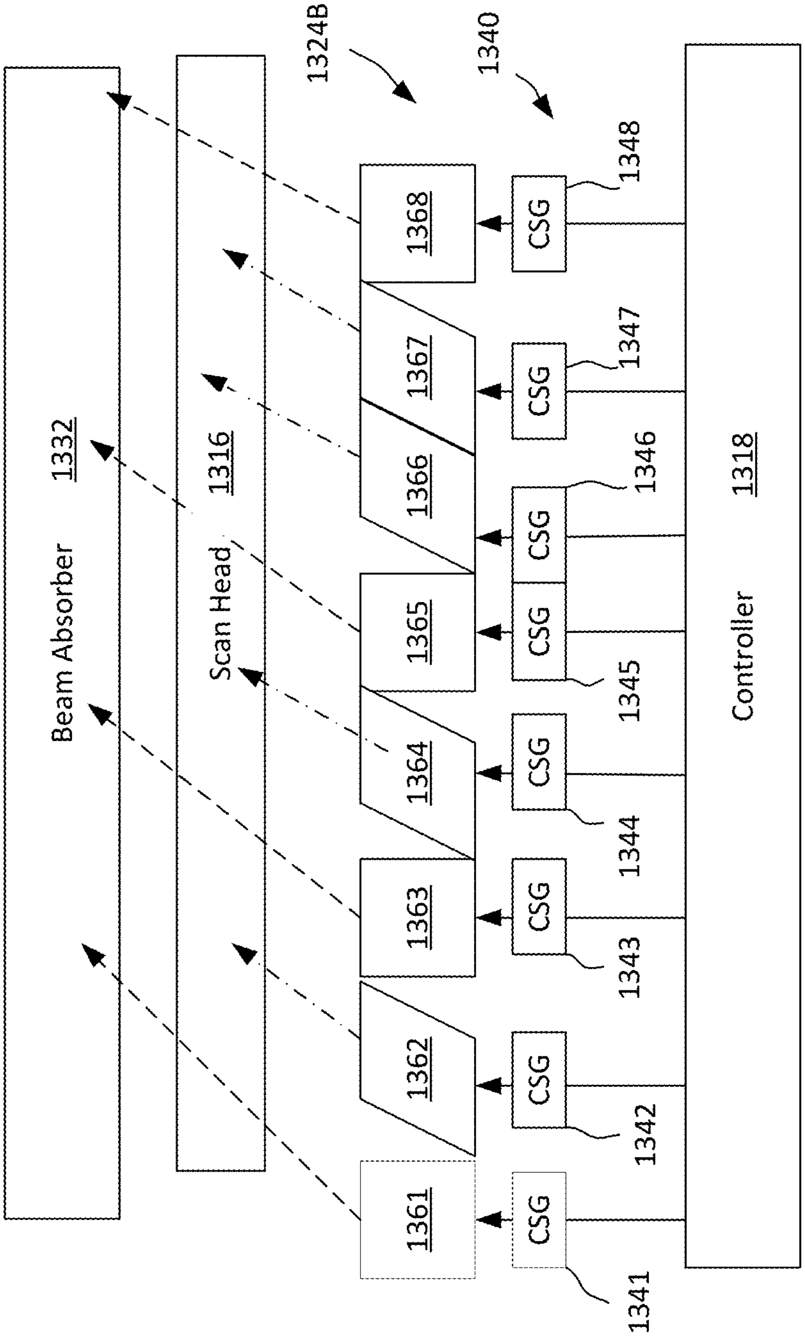
FIG. 13B illustrates a block diagram of a pulse shaping modulator with reflective optical elements tilted.

FIG. 13B illustrates a block diagram of a pulse shaping modulator 1324B with reflective optical elements tilted. Assume that the array of reflective optical elements 1361, 1362, 1363, 1364, 1365, 1366, 1367, and 1368 may have a first physical orientation to reflect a received spatial profile of the laser beam impinging on the optical element directly to the beam absorber 1332. In other words, the reflective optical elements 1361, 1362, 1363, 1364, 1365, 1366, 1367, and 1368 may be configured to be individually tilted. By way of non-limiting example, a DMD may be configured to tilt an optical element ±12°. While the reflective optical elements are described as being tilted to change a direction of propagation of the laser beam or laser beamlets, in some embodiments, the reflective optical elements may be made of a material which changes its reflectivity to reflect the laser beam or laser beamlets in a particular direction.

The array of reflective optical elements 1361, 1362, 1363, 1364, 1365, 1366, 1367, and 1368 may have a second physical orientation to reflect a received spatial profile of the laser beam impinging on the optical element directly to a scan head 1316. The terms "first" and "second" are used for a frame of reference or to denote a reference point. The term "first" physical orientation is not preferred over the "second" physical orientation.

A selected pattern of portions of the received spatial profile of the laser beam may be created to achieve a second intensity different from the received intensity of laser beam. Here, in this example, reflective optical elements 1361, 1363, 1365, and 1368 are oriented to reflect to the beam absorber 1332. Here, in this example, reflective optical elements 1362, 1364, 1366 and 1367 are oriented to reflect the laser beam impinging thereon to the scan head 1316. The reflective optical elements 1362, 1364, 1366 and 1367 being selected as the selected pattern of portions of the received spatial profile of the laser beam to achieve a second intensity different from the received intensity of laser beam. The CSG 1341, 1342, 1343, 1344, 1345, 1346, 1347, and 1348 may generate one of an electronic signal, a light stimulus, a thermal stimulus, an acoustic stimulus, other types of electromagnetic stimuli or other control signal to control at least one optical property of the optical elements 1351, 1352, 1353, 1354, 1355, 1356, 1357, and 1358 to which the CSG is coupled.

Figure 13C:
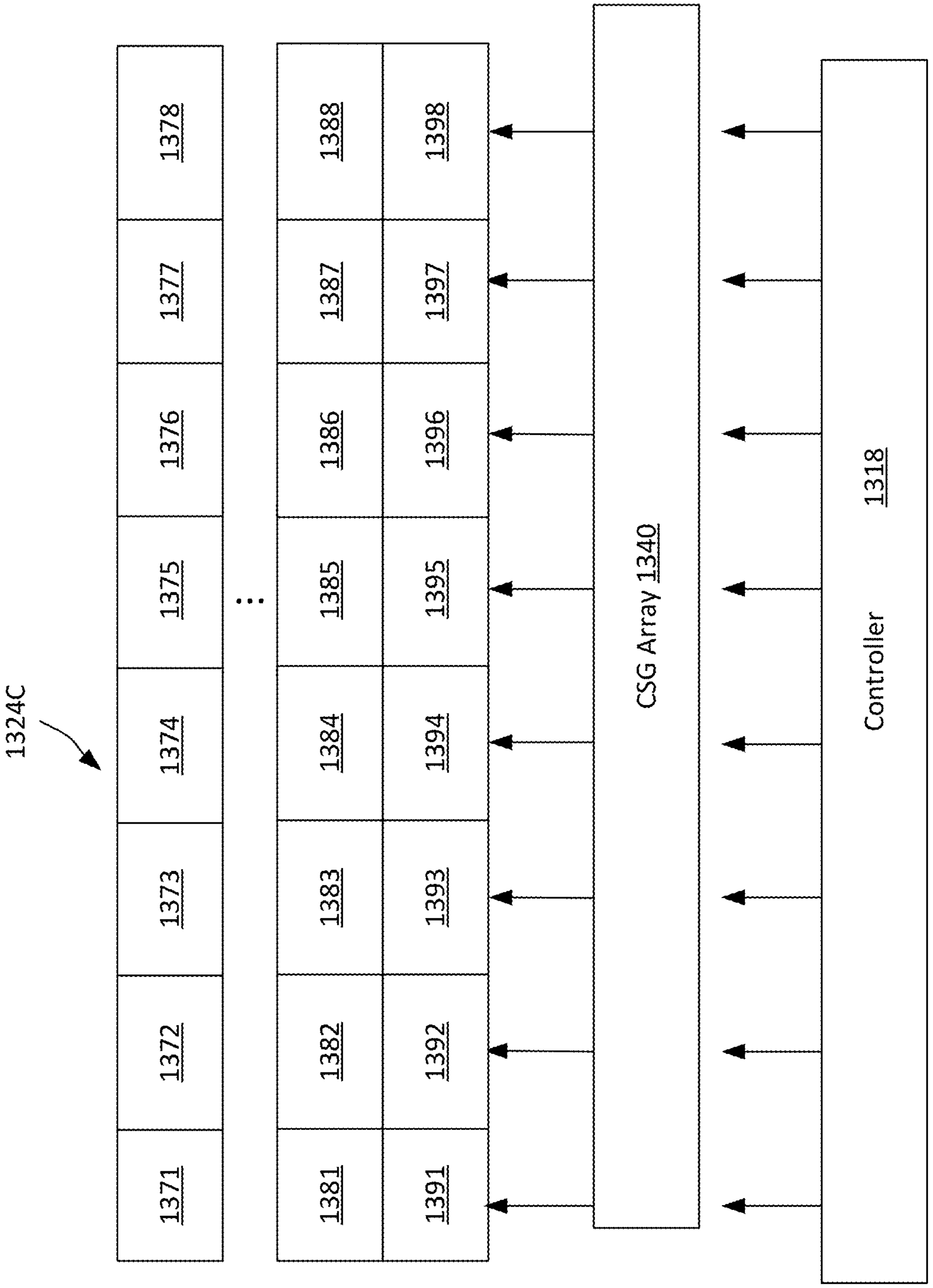
FIG. 13C illustrates a block diagram of a pulse shaping modulator with a multi-dimensional array of optical elements.

FIG. 13C illustrates a block diagram of a pulse shaping modulator 1324C with a multi-dimensional array of optical elements 1371-1378 in a first row, optical elements 1381-1388 in a second row and optical elements 1391-1398 in a third row. These optical elements may be transmissive, reflective and/or refractive. The optical elements 1371-1378 in a first row, optical elements 1381-1388 in a second row and optical elements 1391-1398 in a third row are individually controlled by an array of control signal generators 1340.

Figure 14:
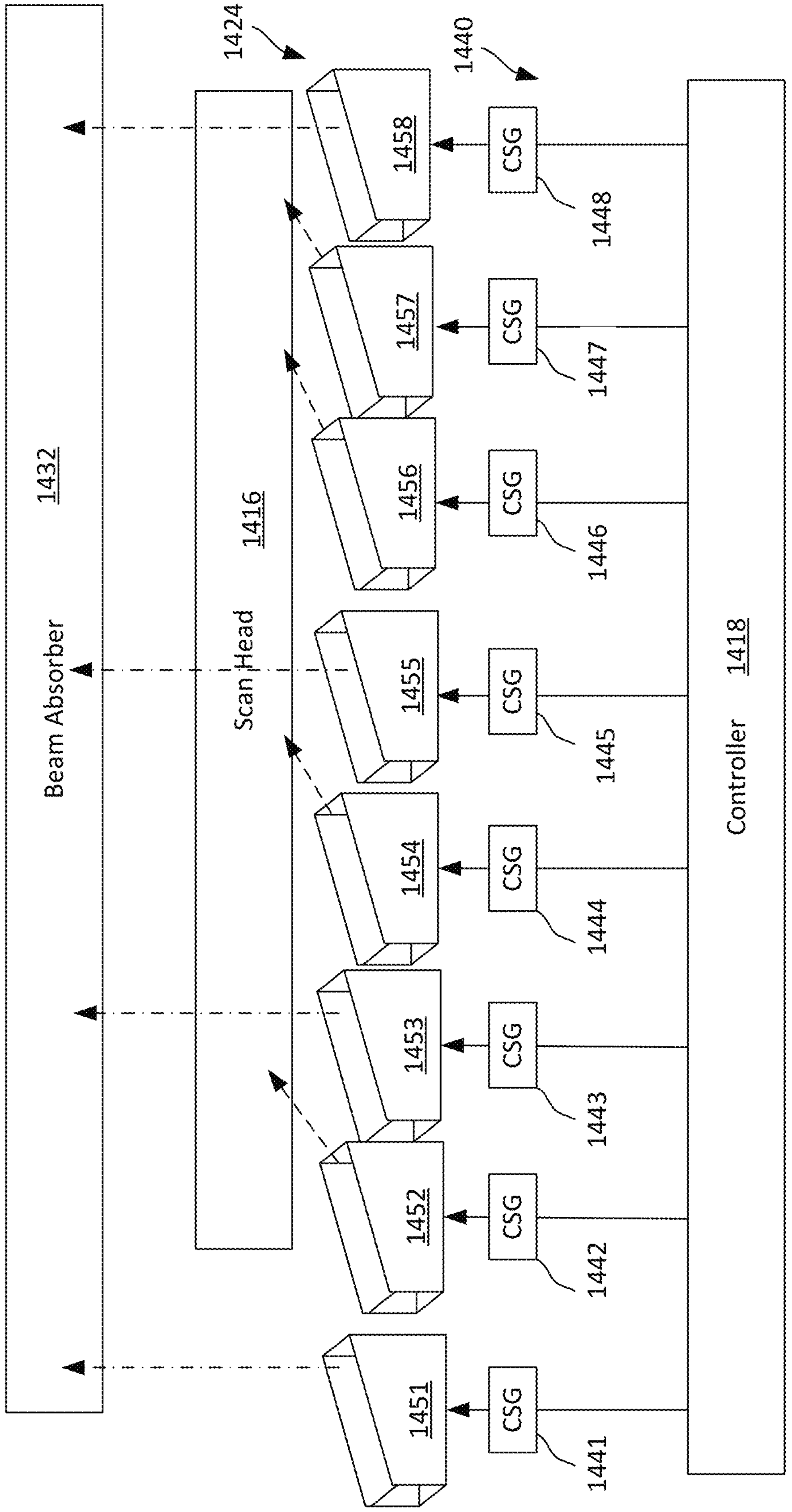
FIG. 14 illustrates a block diagram of a pulse shaping modulator with an array of refractive optical elements.

FIG. 14 illustrates a block diagram of a pulse shaping modulator with an array of refractive optical elements. The array of refractive optical elements 1451, 1452, 1453, 1454, 1455, 1456, 1457, and 1458 are each individually controllable via controller 1418. The controller 1418 may be coupled to control signal generators (CSG) 1441, 1442, 1443, 1444, 1445, 1446, 1447, and 1448. Here, the material properties of each optical element 1451, 1452, 1453, 1454, 1455, 1456, 1457, and 1458 are controlled to either refract the impinging laser beam to one of the scan head 1416 or the beam absorber 1432.

The optical elements 1452, 1454, 1456 and 1457 direct their portion of the laser beam to the scan head 1416. The optical elements 1451, 1453, 1455 and 1458 direct their portion of the laser beam to the beam absorber 1432. The optical elements 1452, 1454, 1456 and 1457 represent the selected pattern of portions of the received spatial profile of the laser beam created to achieve a second intensity different from the received intensity of laser beam.

Other such means of modulation could be considered. Additionally, beam shaping optics may be utilized to convert a Gaussian beam, such as from laser source 112 (FIG. 3 or 4), into a top-hat, or donut shaped spatial distribution before modifying the temporal distribution with the modulator, as will be described in more detail in relation to FIGS. 8A and 8B. This provides even more control over the energy deposited on the substrate 120.

In some embodiments, all optical elements may be configured to dump the impinging light to the beam absorber. A control signal would select a pattern of optical elements to transmit to, reflect to or refract to the scan head. In other words, initially the optical elements are initialized to dump to the beam absorber.

In some embodiments, all optical elements may be configured or initialized to transmit, reflect or refract the impinging light to the scan head. A control signal would select a pattern of optical elements to transmit, reflect or refract the impinging light to the scan head and the remainder (non-selected) to dump to the beam absorber.

Figure 7:
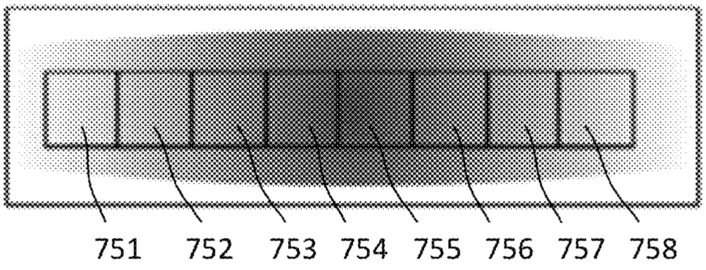
FIG. 7 illustrates a representation of a linear array of optical devices with the elongated beam projected thereon.
Figure 8A:
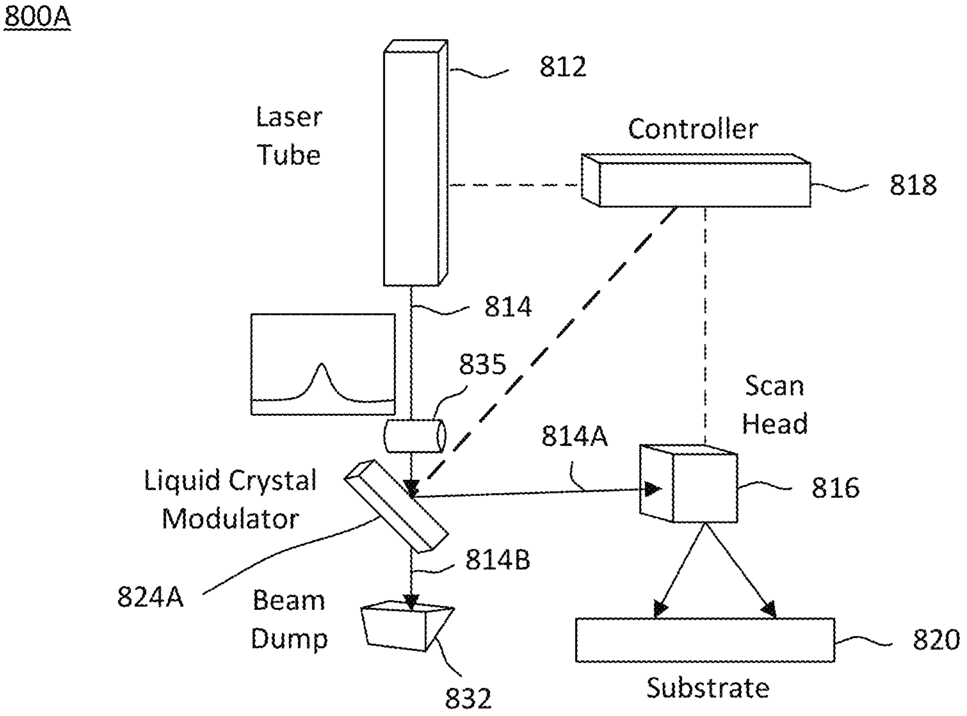
FIG. 8A illustrates a laser marking system using an array of reflective devices.
Figure 8B:
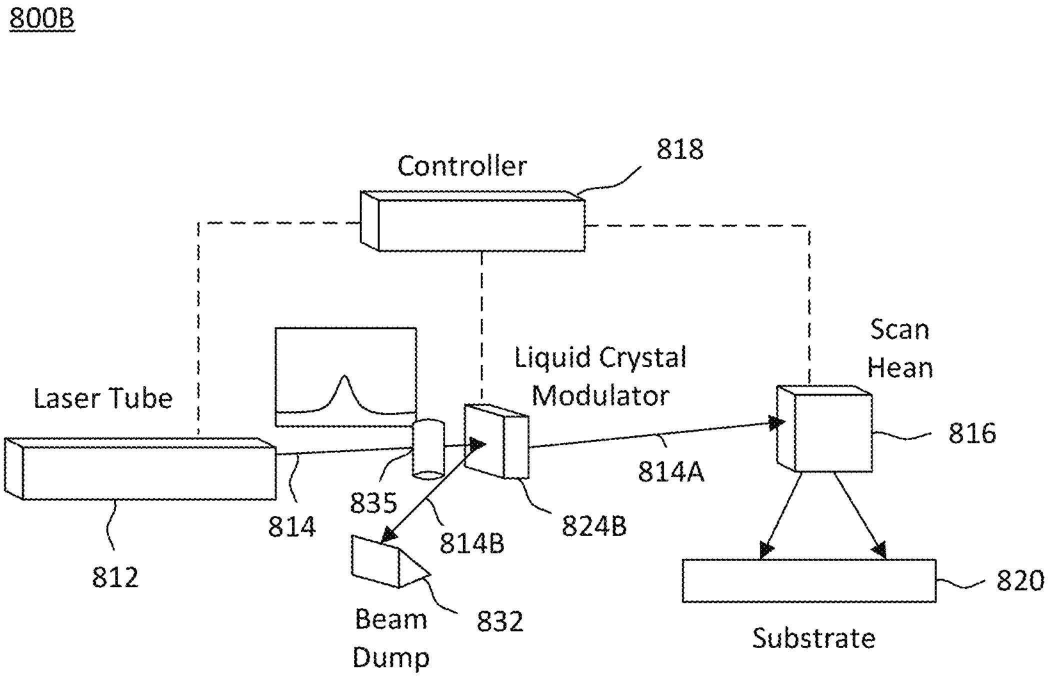
FIG. 8B illustrates a laser marking system using an array of transmissive devices.

FIG. 8A illustrates a laser marking system 800A using an array of reflective devices. FIG. 8B is the beam a laser marking system 800B using an array of transmissive devices. The operation of the laser marking system 800A or 800B will be described in relation to FIGS. 5-7, 9-10 and 11A-11B. In the embodiment of FIG. 8A, the pulse shaping modulator 824A may include an array of reflective devices, such as the above-referenced MOEM, LCD, SLM or PCM to control power deposited or delivered to the substrate.

Figure 5:
FIG. 5 illustrates a representation of a laser beam pattern of a standard Gaussian spatial profile of a laser beam.
Figure 6:
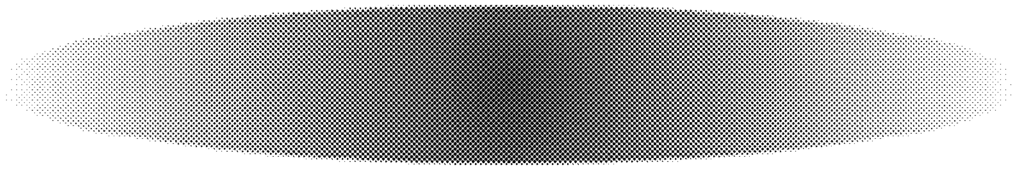
FIG. 6 illustrates a representation of the laser beam of FIG. 5 elongated in one dimension.

FIG. 5 illustrates a representation of a laser beam pattern 500 of a standard Gaussian spatial profile of a laser beam. FIG. 6 illustrates a representation of a laser beam pattern 600 of the laser beam of FIG. 5 elongated in one dimension. The elongation may be accomplished by a beam shaping optical element(s) after the laser source but before the modulator or integrated in the modulator. FIG. 7 illustrates a representation of a linear array of optical devices 751-758 with the elongated beam projected thereon. In the illustration, the intensity of the laser beam across the optical device 751-758 is varied such that each optical device is configured to transmit or reflect its own intensity impinging thereon. In some embodiments, each optical device 751-758 may have the same intensity impinging thereon.

Assume, the initial laser beam pattern from laser source 812 has a Gaussian spatial profile. The laser source 812 may vary this Gaussian spatial profile according to macro-pulse shaping properties. The Gaussian spatial profile is for illustrative purposes and other laser beam profiles may be used.

With respect to FIG. 8A, the laser marking systems 800A may include pulse shaping optics 835 which may be positioned at a location in-line with the laser source 812 but before the modulator 824A. The pulse shaping optics 835 may convert a Gaussian beam, such as from laser source 812, into a top-hat, or donut shaped spatial distribution before modifying the temporal distribution with the modulator. The pulse shaping optics 835 may expand a Gaussian beam, such as from laser source 812. The means of expanding the spatial profile of the initial beam may comprise anamorphic optical elements, a telescope, or a single lens such as with a cylindrical power.

The modulator 824A may include an array of light reflective devices (i.e. optical elements 1361-1368 of FIG. 13B) or an array of light refractive devices (i.e. optical elements 1451-1458 of FIG. 14) that are configured to divide the laser beam 814 into first portions 814A that are directed to the scan head 816 and second portions 814B that are directed to a laser beam absorbing device 832. More specifically, one or more controllers 818 are provided to control the state of the reflective devices (i.e. optical elements 1361-1368 of FIG. 13B) to reflect portions of the laser beam 814 to generate first portions 814A and second portions 814B. The one or more controllers 818 may control a refraction of the material of the refractive devices (i.e. optical elements 1451-1458 of FIG. 14) to refract portions of the laser beam 814 to generate first portions 814A and second portions 814B. The optical elements whether reflective, refractive or transmissive each divides the received (initial) laser beam into laser beamlets, sometimes referred to as a pixelated beam. The number of individual beamlets equals the number of optical devices.

In addition, each reflective device (i.e. optical elements 1361-1368 of FIG. 13B) is configured to include an array of reflective such as the above mentioned array of mirrors or micromirrors to generate beamlets of the first laser portion 814A, which may be referred to as a pixelated beam delivered to the scan head 816. The refractive devices may include optical elements 1451-1458 (FIG. 14) which include liquid crystal pixels to generate beamlets of the first laser portion 814A, which may be referred to as a pixelated beam delivered to the scan head 816.

Each reflective, refractive or transmissive device of the array of devices defines a pixel. As described below with respect to a method for generating a mark on a substrate the controller 818 and scan head 816 are configured to scan the pixelated beam across a marking field of the substrate to generate an image within the marking field.

FIG. 8B is the beam a laser marking system 800B using a modulator 824B having an array of transmissive devices (or optical elements) which are controlled to either transmit light therethrough or attenuate the light impinging on each optical element such that the light is blocked. In some embodiments, an array of transmissive devices (or optical elements) may vary the intensity or magnitude of the light beam transmitted therethrough. For example, non-selected optical elements may be controlled to attenuate 100% of the beam impinging thereon and other optical elements which are selected may attenuate the light by 0%. In other embodiments, one or more of the selected optical elements may attenuate the light by an amount to change a magnitude of the intensity of the light by an amount which is less than 100% attenuation but greater than 0%.

The overall method or process is now described in reference to FIGS. 5-7, 8A-8B, 9, 10, 11A-11B and 12. In reference to FIG. 5, initially a laser beam 814 is generated having an initial spatial profile from source 812. For example, FIG. 5 represents a laser beam pattern 500 having a Gaussian spatial profile. In some embodiments, a lens with cylindrical power, for example, enlarges the spatial profile of the laser beam 114 in one dimension as in FIG. 6 and FIG. 7 to correspond to dimensions of the modulator 824A or 824B having the array of reflective, refractive or transmissive devices.

Figure 9:
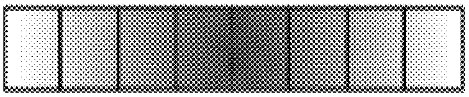
FIG. 9 illustrates a representation of an intensity profile being applied to a linear array of optical elements.
Figure 10:
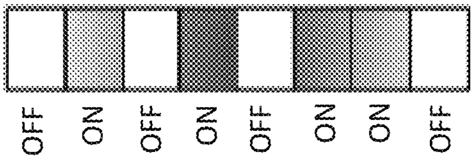
FIG. 10 illustrates a representation of a modified intensity profile from a selected pattern of the optical elements of FIG. 9.

FIG. 9 illustrates a representation of an (received) intensity profile 900 being applied to a linear array of optical elements of a modulator. FIG. 10 illustrates a representation of a modified intensity profile 1000 from a selected pattern of the optical elements of FIG. 9 to cause carbonization of the materials on the substrate 820 without ablation. The modulator 824A may receive the stretched beam 814 at the optical elements of the modulator, as best seen in FIG. 9. Alternately, the modulator 824B may receive the stretched beam at the optical elements or transmissive devices. In the embodiment of FIG. 8A and FIG. 13B, the beamlets are reflected off of the array of movable reflective devices or optical elements. Alternatively, the stretched beam 814 may be diffracted or refracted by an array of transmissive devices. Still further, the stretched beam 814 may be diffracted or refracted by an array of refractive devices or optical elements.

In any of the cases, a first beam portion 814A is transmitted to the scan head 816 as a pixelated beam including multiple beamlets or selected beam pattern as shown in FIG. 10. In addition, a second portion 8148 (non-selected) of the beam 814 is transmitted to a laser beam absorbing device 832. The reflective, refractive or transmissive devices may have two positions (binary) or continuous positions. The array may be a two-dimensional (2-D) array for more complex beam manipulations, as shown in FIG. 13C.

In reference to FIG. 10, positions of the individual reflective, refractive or transmissive devices are controlled such that any linear on/off image pattern can be generated. The "OFF" state devices reflect, refract or transmit the laser power or second portion of the beam 814 to the beam absorbing device 832 (beam dump) and the "ON" devices reflect or transmit the first portion 814A to the scan head 816. FIG. 10 shows an example of a resulting selected pattern.

As can be seen from the pattern of FIG. 10, the pattern of selected optical elements is selected to produce a plurality of laser beamlet pulse characteristics including peak intensity, pulse width, fall time and rise time. In the pattern, moving from left to right, the first "ON" pixel has a first pulse width and a first intensity. The second "ON" pixel is separated by one pixel from the first "ON" pixel and has a second pulse width and a second intensity. The first pulse width and second pulse width may be the same. However, the first intensity and the second intensity may be different. The next "ON" pixel or the third "ON" pixel is separated by one pixel from the second "ON" pixel but is directly adjacent to a fourth "ON" pixel. Thus, the third "ON" and fourth "ON" are two side-by-side beamlets or pixels which collectively form a beamlet with a controlled pulse width.

The one pixel separation between the first "ON" pixel or beamlet and the second "ON" pixel or beamlet may be the necessary thermal separation between the application of the beamlets. The thermal separation may be a function of the thermal conductivity of the substrate and the thermal diffusion. While, only one pixel or beamlet is shown as a basis of thermal separation, other numbers of beamlets may be rendered "OFF" for thermal separation necessary to prevent overheating at a particular location. The thermal separation may also be a function of the intensity of a particular beamlet being applied such as on a particular scan row.

By way of non-limiting example, three, four or five adjacent beamlets or pixels may be selected in a pattern to produce a pulse width of three, four or five beamlets or pixels. A set of adjacent beamlets from a laser beamlet group to generate a laser beam with varying pulse width. Furthermore, any one of the beamlets may be selected for the intensity associated therewith. In some embodiments, all beamlets may be non-selected beamlets as part of a determined pattern. In other embodiments, depending on the mark, all beamlets may be selected as part of a determined pattern. Describing all possible combination of varying pulse widths is prohibitive. The pulse width variations and patterns may be limited by the number of optical elements. The intensity variation is a function of the variation in the initial laser beam pulse shape and any subsequent pulse shaping prior to modulation. The pattern of beamlets is selected to effectuate carbonization of materials of the substrate without ablation to create a mark. A respective one beamlet is applied to a respective one location on the substrate. In some embodiments, a sequence of beamlets, separated in time, are applied to the same location of the substrate to darken the marks through carbonization of materials without ablation.

Furthermore, selecting the adjacent the third and fourth "ON" beamlets also selects the rise and fall of this beamlet group. For example, selecting other adjacent beamlets in the series of the optical elements would cause a different rise time and fall time to be selected or controlled with the number of adjacent beamlets effectuating the beam pulse width for that group.

Figure 11A:
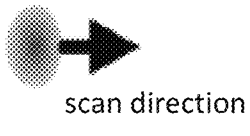
FIG. 11A illustrates the application of a non-modified (standard) laser beam in the direction of scan.
Figure 11B:
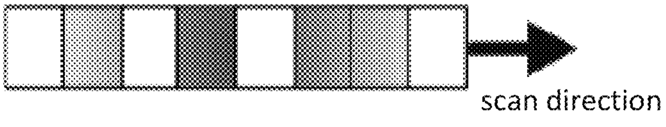
FIG. 11B illustrates the application of a scanned pixelated laser beam.

FIG. 11A illustrates the application of a non-modified (standard) laser beam 1100A in the direction of scan. FIG. 11B illustrates the application of a scanned pixelated laser beam based on a single pattern being applied to a substrate.

Figure 12:
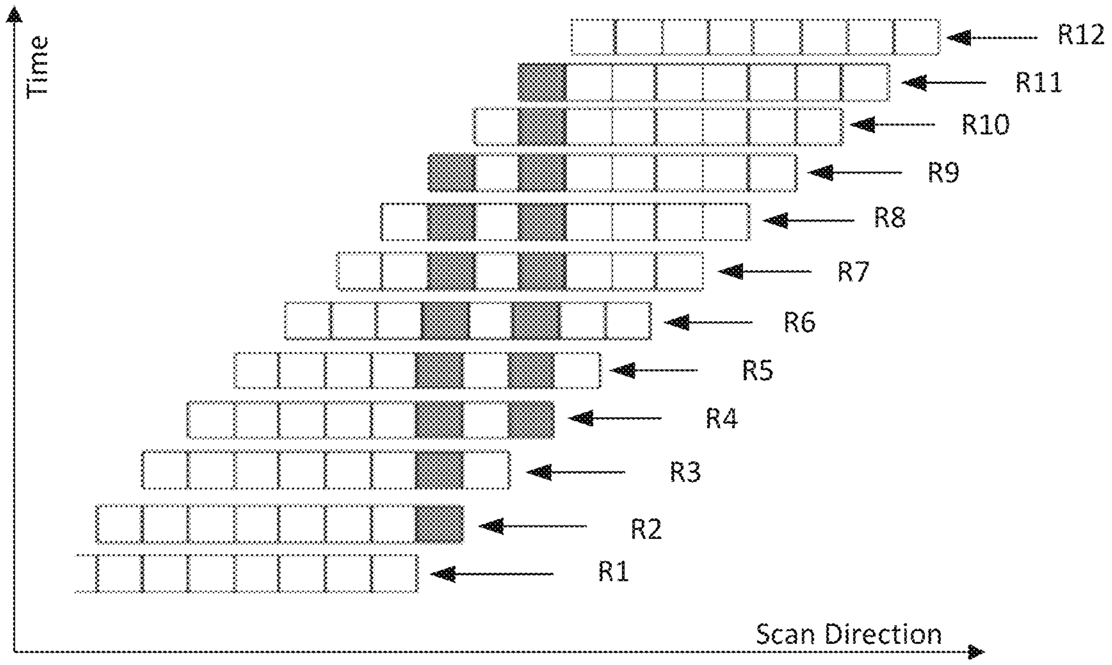
FIG. 12 illustrates a graphical representation of a two-pixel scanned pattern to effectuate carbonization to produce a mark.

FIG. 12 illustrates a graphical representation of a two-pixel scanned pattern 1200 to effectuate carbonization to produce a mark. FIG. 12 represents a sequence of 12 rows of beamlet patterns, separated in time/scan row. The pattern of beamlets is shifted or altered so that a sequence of beamlets is applied to the same location to form the mark at the desired contrast with the substrate through carbonization of materials without ablation.

The printer's scan head is controlled to swipe or scan the pixelated beam or pattern of FIG. 10 across and within the marking field of the paper substrate in the same manner as used for a standard laser marking system. The control the individual mirrors in sync with the printer scanner and the message to be printed. By doing so, a static pattern is produced on the substrate using a dynamic pattern during scanning.

FIG. 12 shows an example of how a static pattern of two pixels is exposed on the substrate for a substantially longer time producing the same pattern as if the starting beam were scanned across.

The exposure time per pixel increases linearly with the number of mirrors in the array and therefore the energy on the substrate increases linearly. This speeds up the process and provides a means of controlling the heating of the substrate. Using this approach, you can create any desired pattern to produce any image on the substrate using carbonization without ablation.

This concept can be expanded to include a 2-D mirror array. All "off" pixels would be directed into a beam absorber dump. This allows the laser to be operated in continuous wave (CW) mode providing better power stability. The high speed switching mirrors determine the speed of pattern generation and not the much slower rise time and fall time of a CO2 laser source. That is, the relatively slow rise and fall times of a typical CW CO2 laser can be effectively increased by using high speed mirrors to modify the pulse shape.

Note that the printed resolution is determined by the size of the carbonized spot and not the best-focus spot size. This method allows carbonization spot to be less than the projected pixel's dimension. Because the mirrors can be positioned to a much higher resolution, sub-pixel positioning of multiple pixel exposures produces sub-pixel sized carbonization spots. This is a known technique used in super-resolution cameras.

A further enhancement in speed could be accomplished using a super-pulsed laser or a q-switched laser. Synchronization of a fast laser with a mirror array would allow 100% utilization of the laser power and minimizing the dwell time of the mirrors.

Figure 15:
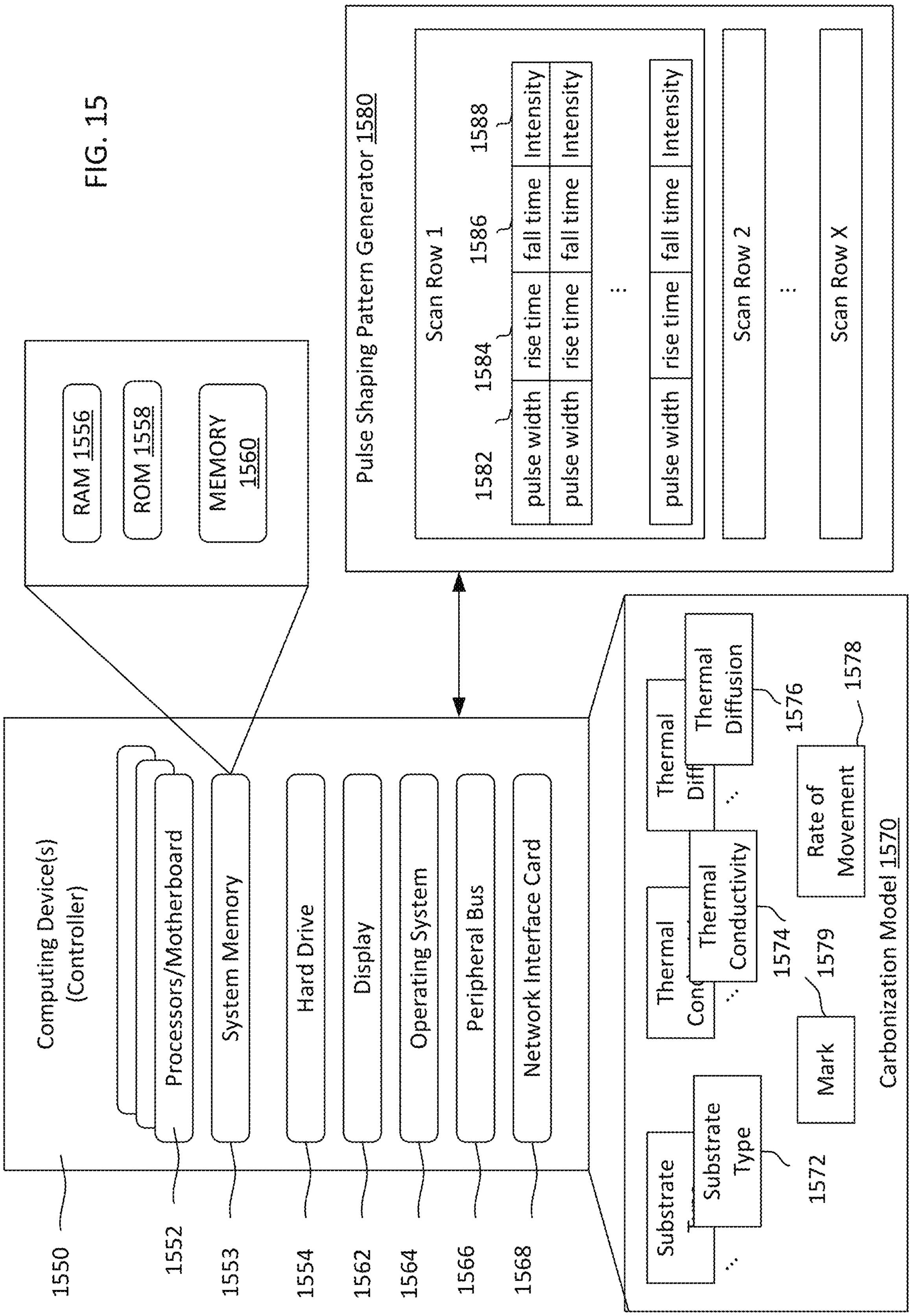
FIG. 15 illustrates a block diagram of computing device.

FIG. 15 illustrates a block diagram of the computing device 1550. A controller 118 (FIG. 3) may also be a computing device 1550 or may be a separate processor interfaced with a main computing device. The controller 118 of the laser marking system 100A, 1008, 800A or 800B, and the controllers of the below-described embodiments, may be a single controller or multiple controllers to control different components of the laser marking systems disclosed herein. The term "controller" as used herein means the electronic circuitry that carries out executable instructions of a computer program according to arithmetic, logic, control and input/output (I/O) operations as specified by the instructions. For example, in some embodiments, the controller 118 may also be programmed to perform as a proportional-integral-derivative (PID) controller to compare a detected or measured color contrast to lower and upper contrast thresholds, and transmit signals in response to a detected contrast above or below the thresholds.

The system may include a carbonization model 1570 to generate the selected pattern of portions of the received spatial profile to produce the controlled power deposition based on carbonizing components of the material of the substrate. The carbonization model 1570 may include a plurality of substrate types (or paper types) 1572, thermal conductivity 1574 per type and thermal diffusion 1576 per type. The model 1570 may be based on the rate of movement of the substrate 1578 and the components of the mark 1579. The components may include date, time, alphanumeric characters or other indicia. Other parameter may include the first intensity of the laser beam and the pulse shape of the initial laser beam. The thermal diffusion in the substrate may be based on thermal conductivity of the substrate.

The system may include a micro-pulse shaping pattern generator 1580 for each scan row 1, row 2, . . . , row X. Each row would include at least one beamlet wherein each beamlet has a pulse width 1582, a location in the series of optical elements to define the rise time 1584 and fall time 1586. For example, selection of the first optical element in the array has a different rise and fall time than the selection of the last optical element in the array. Each beam also has an intensity 1588. The intensity may be controlled such as through attenuation in some embodiments. A group of beamlets would have its own pulse width and rise and fall times based on which selected adjacent beamlets in the series of optical elements as selected.

The computing device 1550 may include one or more processors 1552 and system memory in hard drive 1554. Depending on the exact configuration and type of computing device, system memory may be volatile (such as RAM 1556), non-volatile (such as read only memory (ROM 1558), flash memory 1560, and the like) or some combination thereof. System memory may store operating system 1564, one or more applications, and may include program data for performing one or more operations, functions, methods and processes described herein.

Computing device 1550 may also have additional features or functionality. For example, computing device 1550 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of the device.

Computing device 1550 may also include or have interfaces for input device(s) (not shown) such as a keyboard, mouse, pen, voice input device, touch input device, etc. The computing device 1550 may include or have interfaces for connection to output device(s) such as a display 1562, speakers, etc. The computing device 1550 may include a peripheral bus 1566 for connecting to peripherals. Computing device 1550 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device 1550 may include a network interface card 1568 to connect (wired or wireless) to a network.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD).

Figure 16:
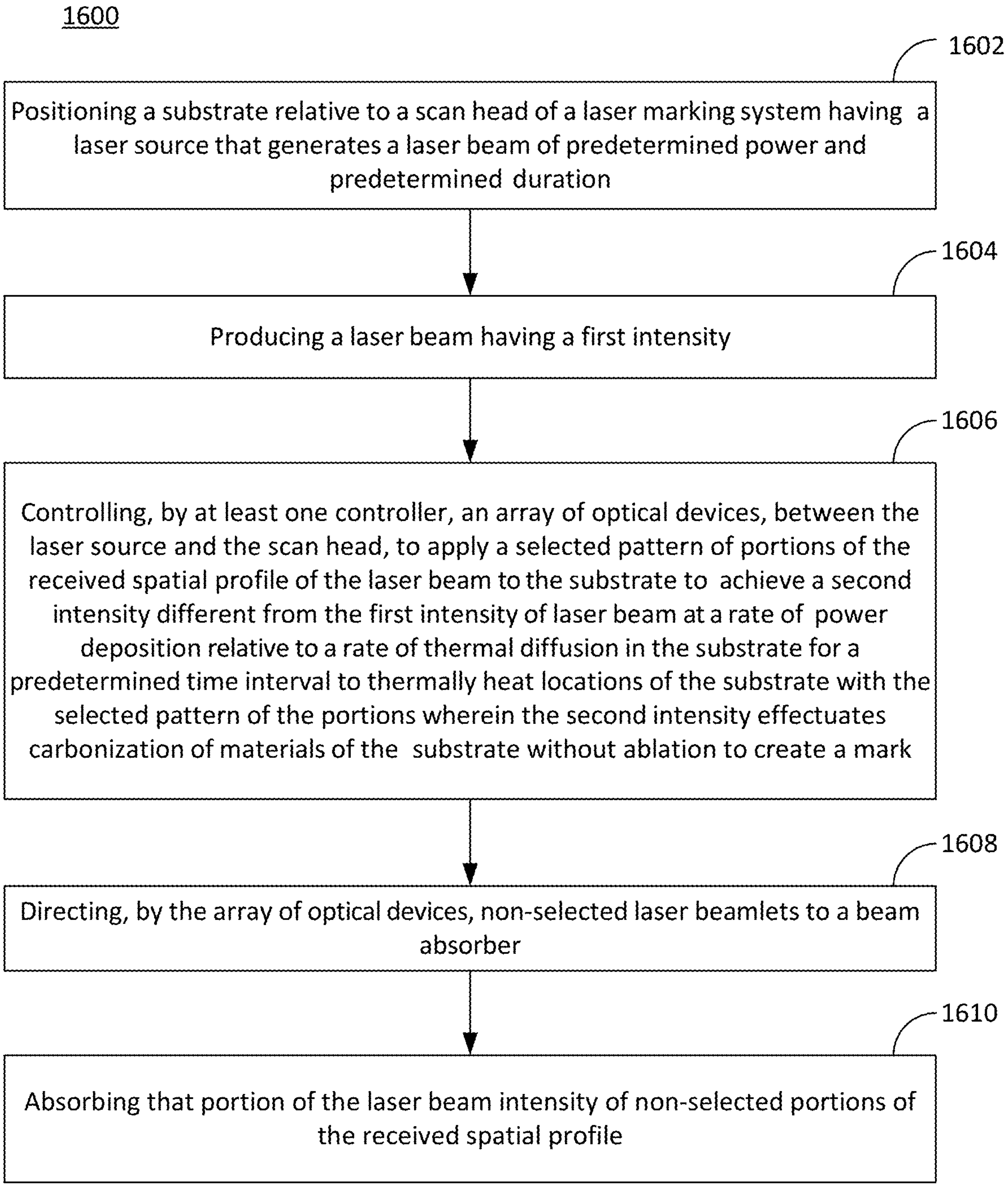
FIG. 16 illustrates a method of controlled carbonization marking without ablation.

FIG. 16 illustrates a method of controlled carbonization marking without ablation. The method steps of marking a substrate through carbonization will now be described in more detail. The methods herein may be performed in the order of the blocks shown or a different order. The method blocks may be performed contemporaneously. Other blocks may be added or deleted.

The method 1600 of laser marking a substrate may comprise, at block 1602, positioning a substrate relative to a scan head of a laser marking system having a laser source (i.e., laser source 112 or 812) that generates a laser beam of predetermined power and predetermined duration. The predetermined power and duration to form a pulse shape may be varied through macro-pulse shaping control at the laser source. The method 1600 may comprises, at block 1604, producing a laser beam having a first intensity. The method 1600 may comprises, at block 1606, controlling, by at least one controller (i.e., controller 118 or 818), an array of optical devices, between the laser source and the scan head (i.e., scan head 116 or 816), to apply a selected pattern of portions of the received spatial profile of the laser beam to the substrate (i.e., substrate 120 or 820) to achieve a second intensity different from the first intensity of laser beam at a rate of power deposition relative to a rate of thermal diffusion in the substrate for a predetermined time interval to thermally heat locations of the substrate with the selected pattern of the portions wherein the second intensity effectuates carbonization of materials of the substrate without ablation to create a mark.

The method 1600 may comprises, at block 1608, directing, by the array of optical devices, non-selected laser beamlets to a beam absorber (i.e., absorber 132 or 832); and, at block 1608, absorbing, by the absorber, the non-selected laser beamlets directed thereto.

Figure 17:
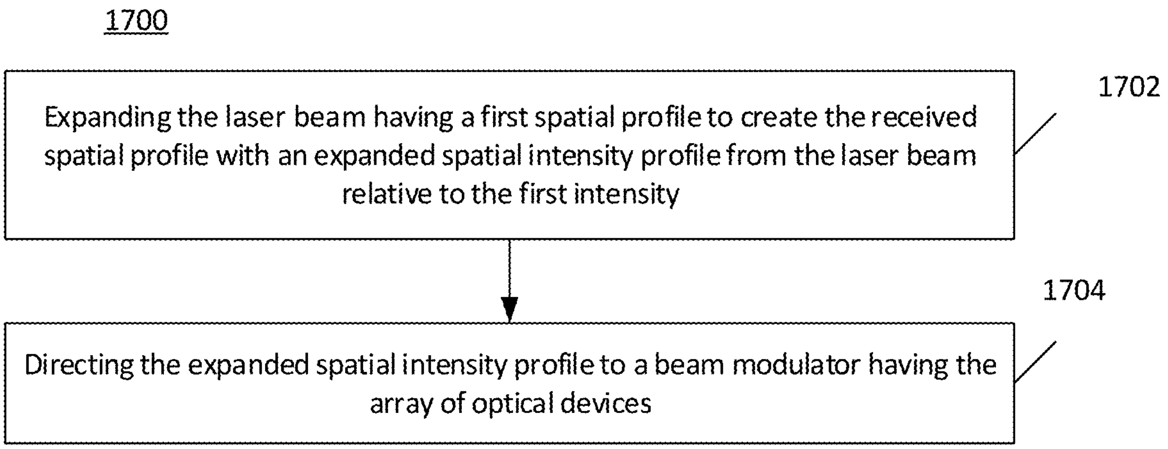
FIG. 17 illustrates a method of pre-modification of laser beam pulse shape.

The method 1600 may alter the spatial profile impinging on the optical devices. FIG. 17 illustrates a method 1700 of pre-modification of laser beam pulse shape.

Referring now to FIG. 17, the method 1700 of altering the spatial profile prior to modulation may include, at block 1702, expanding the laser beam having a first spatial profile to create the received spatial profile with an expanded spatial intensity profile from the laser beam relative to the first intensity. The method 1700 may include, at block 1704, directing the expanded spatial intensity profile to a beam modulator having the array of optical devices.

Figure 18:
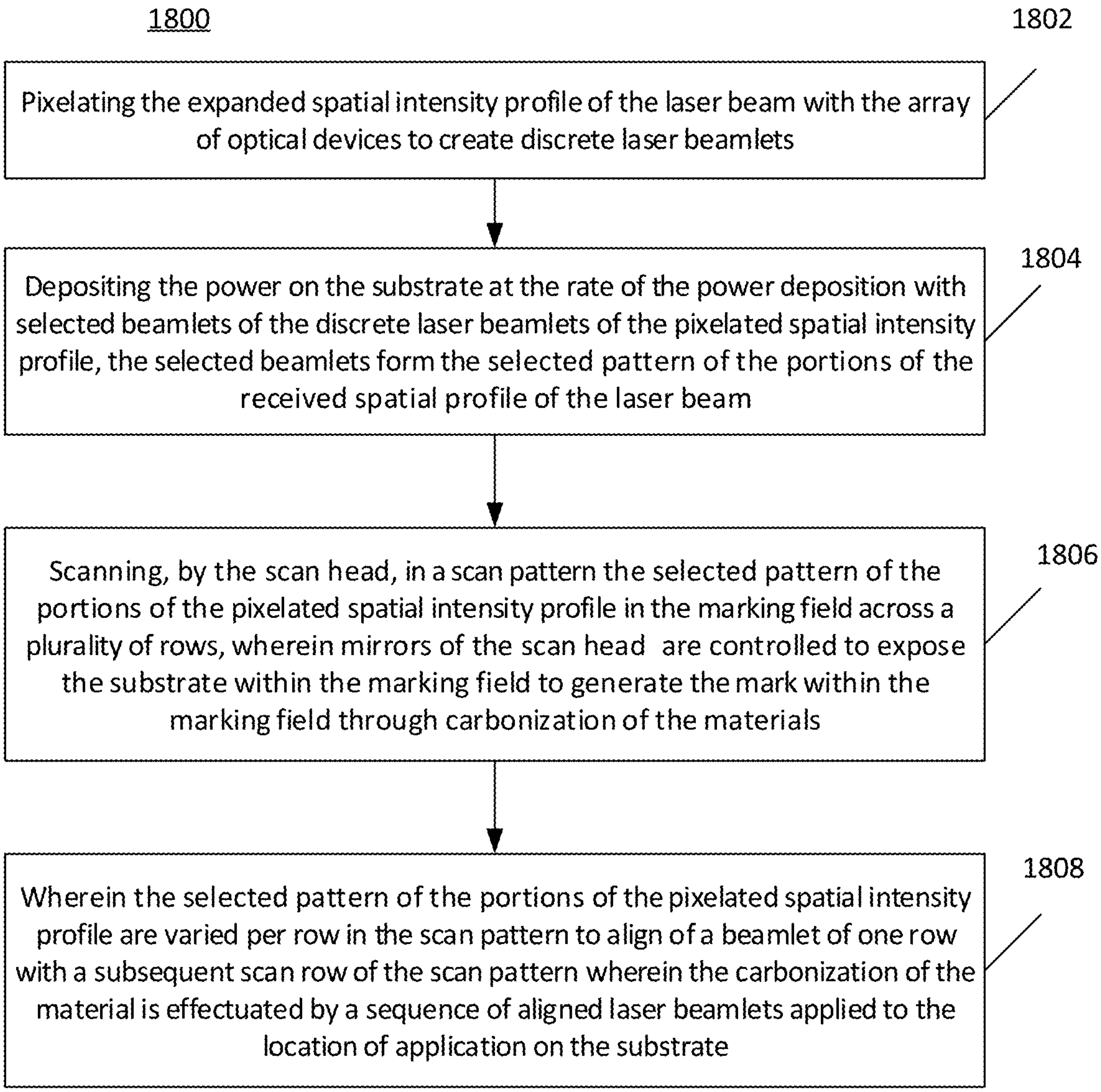
FIG. 18 illustrates a method of pixilation of the laser beam.

FIG. 18 illustrates a method 1800 of pixilation of the laser beam. Referring now to FIG. 18, the method 1800 of pixelating the spatial profile by the modulation may include, at block 1802, pixelating the expanded spatial intensity profile of the laser beam with the array of optical devices to create discrete laser beamlets. The method 1800 may include, at block 1804, depositing the power on the substrate at the rate of the power deposition with selected beamlets of the discreate laser beamlets of the pixelated spatial intensity profile, the selected beamlets form the selected pattern of the portions of the received spatial profile of the laser beam. In some embodiments, the deposition of the power with the selected beamlets of the pixelated spatial intensity profile, includes selecting beamlets in a beamlet pattern which provides for thermal separation to compensate for thermal diffusion at the locations of the power application to the substrate 820.

The method may further comprise, at block 1806, scanning, by the scan head 816, in a scan pattern the selected pattern of the portions of the pixelated spatial intensity profile in the marking field across a plurality of rows, wherein mirrors of the scan head 816 are controlled to expose the substrate 820 within the marking field to generate the mark within the marking field through carbonization of the materials. At block 1808, the selected pattern of the portions of the pixelated spatial intensity profile are varied per row in the scan pattern (FIG. 12) to align of a beamlet of one row with a subsequent scan row of the scan pattern wherein the carbonization of the material is effectuated by a sequence of aligned laser beamlets applied to the same location of application on the substrate.

The selected pattern of portions of the received spatial profile to produce the controlled power deposition is based on carbonizing components of the material of the substrate, a rate of movement of the substrate, the first intensity of the laser beam, thermal conductivity of the substrate, and content of the mark wherein the thermal diffusion in the substrate being based on thermal conductivity of the substrate. The selected pattern may be based on the carbonization model 1570.

The rate of the power deposition may be based on the laser beam pulse characteristics comprise peak intensity, pulse width, fall time and rise time associated at the laser beam pulse shape of each beamlet or combination of beamlets (adjacent beamlet groups) and separation between beamlets or beamlet groups.

The system is configured to control the beam modulator device to control selection of one or more optical devices of the array of optical devices to generate the selected pattern of portions of the received spatial profile to effectuate carbonization without ablation.

In some embodiments, the laser marking systems 100A, 100B, 800A and 800B may include a sensor coupled to the controller and computer vision system as described in relation to FIG. 2. Thus, in some embodiments, the method may further comprise sensing, by a sensor, a condition of the mark generated on the substrate; and controlling, by the at least one controller in signal communication with the sensor and the laser source, a duration of the power deposition applied to the substrate by the selected pattern of portions of the received spatial profile in response to the detected condition of the mark to effectuate further carbonization of materials of the substrate; and repeating the sensing until a final carbonization level achieved.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application.

Furthermore, many modifications may be made to adapt a particular situation or material to the teachings of the embodiments without departing from the scope thereof. Therefore, the breadth and scope of the subject matter provided herein should not be limited by any of the above explicitly described embodiments. Rather, the scope of the embodiments should be defined in accordance with the following claims and their equivalents.

The invention claimed is:

1. A method of laser marking a substrate, the method comprising:

positioning the substrate relative to a scan head of a laser marking system having a laser source that generates a laser beam of predetermined power and predetermined duration;

producing the laser beam having a first intensity;

determining, by at least one controller, a rate of power deposition based on a carbonization model and a substrate type, the carbonization model stored in a non-transitory machine-readable medium and including a plurality of substrate types, thermal conductivity associated with the plurality of substrate types, and rates of thermal diffusion associated with the plurality of substrate types; and controlling, by the at least one controller, a modulator, between the laser source and the scan head, to apply the laser beam to the substrate for a selected time interval to achieve a second intensity different from the first intensity of the laser beam at the rate of power deposition relative to the rate of thermal diffusion in the substrate for the selected time interval to thermally heat locations of the substrate with the laser beam wherein the second intensity effectuates carbonization of materials of the substrate without vaporization of the substrate to create a mark.

2. The method of claim 1, wherein the controlling comprises changing one or more material properties of the modulator to control a rise time and a fall time of the laser beam applied to the substrate.

3. The method of claim 1, wherein the modulator comprises an array of optical devices, wherein the controlling comprises transmitting, at a first time, a first signal to the array of optical devices such that the laser beam is applied to the substrate at the first time and transmitting, at a second time, a second signal to the array of optical devices such that the laser beam is not applied to the substrate at the second time, wherein the selected time interval is based on the first time and the second time.

4. The method of claim 3, wherein the array of optical devices include an array of reflective optical elements, wherein the array of reflective optical elements are configured to reflect the laser beam at the substrate at the first time and wherein the array of reflective optical elements are configured to reflect the laser beam at a laser beam absorbing device at the second time.

5. The method of claim 3, wherein the array of optical devices include an array of transmissive optical elements, wherein the array of transmissive optical elements are configured to transmit the laser beam at the substrate at the first time and wherein the array of transmissive optical elements are configured to transmit the laser beam at a laser beam absorbing device at the second time.

6. The method of claim 3 further comprising:

directing the laser beam to the modulator having the array of optical devices; pixelating the laser beam with the array of optical devices to create discrete laser beamlets; and depositing power on the substrate, between the first time and the second time, at the rate of the power deposition with selected beamlets of the discrete laser beamlets of a pixelated spatial intensity profile.

7. The method of claim 6 wherein the deposition of the power with the selected beamlets of the pixelated spatial intensity profile, includes:

selecting a sequence of beamlets of the discrete laser beamlets, separated in time, between the first time and the second time; and depositing power on the substrate, using the sequence of beamlets of the discrete laser beamlets, separated in time between the first time and the second time to provide for thermal separation to compensate for thermal diffusion at fixed locations of the power deposition to the substrate.

8. The method of claim 6 further comprising:

scanning, by the scan head, in a scan pattern the selected beamlets of the discrete laser beamlets in a marking field of the substrate between the first time and the second time, wherein mirrors of the scan head are controlled to expose the substrate within the marking field to generate the mark within the marking field through carbonization of the materials.

9. The method of claim 3 wherein the array of optical devices comprises one of reflective devices and refractive devices; and further comprising:

directing, at the second time, by the array of optical devices, the laser beam to a beam absorber.

10. The method of claim 1 wherein the selected time interval to apply the controlled power deposition is based on carbonizing components of the materials of the substrate, a rate of movement of the substrate, the first intensity of the laser beam, thermal conductivity of the substrate, and content of the mark wherein the thermal diffusion in the substrate is based on the thermal conductivity of the substrate, wherein the thermal conductivity of the substrate is based on the carbonization model and the substrate type.

11. The method of claim 1 wherein the rate of the power deposition is based on a fall time and a rise time.

12. The method of claim 1 further comprising:

sensing, by a sensor, a condition of the mark generated on the substrate; controlling, by the at least one controller in signal communication with the sensor and the laser source, the selected time interval of the power deposition applied to the substrate by the laser beam in response to the sensed condition of the mark to effectuate further carbonization of materials of the substrate; and repeating the sensing until a final carbonization level achieved.

13. The method of claim 1, wherein the controlling comprises selecting a rise time and a fall time of the laser beam applied to the substrate, wherein the selected time interval is based on the rise time and the fall time.

14. A laser marking system having a scan head for marking a substrate via carbonization of components of the substrate, the laser marking system comprising:

a laser source that generates a laser beam of predetermined power, spatial profile and predetermined duration;

a modulator between the laser source and the scan head; and at least one controller to control the modulator, the controller configured to:

determine a rate of power deposition based on a carbonization model and a substrate type, the carbonization model stored in a non-transitory computer-readable medium and including a plurality of substrate types, thermal conductivity associated with the plurality of substrate types, and rates of thermal diffusion associated with the plurality of substrate types, and apply the laser beam to the substrate for a selected time interval to achieve a second intensity different from a first intensity of the laser beam at the rate of power deposition relative to the rate of thermal diffusion in the substrate for the selected time interval to thermally heat locations of the substrate with the laser beam wherein the second intensity effectuates carbonization of materials of the substrate without vaporization of the substrate to create a mark.

15. The system of claim 14, wherein the modulator includes one of an electro-optic (EO) modulator, an acousto-optic (AO) modulator, a spatial-light-modulator (SLM), a metamaterial modulator (MM), and a liquid crystal (LC) modulator.

16. The system of claim 15, wherein the controller is configured to transmit a signal to the modulator to change one or more material properties of the modulator to control a rise time and a fall time of the laser beam applied to the substrate.

17. The system of claim 14, wherein the modulator comprises an array of optical devices, wherein the controller is configured to transmit, at a first time, a first signal to the array of optical devices such that the laser beam is applied to the substrate at the first time and wherein the controller is further configured to transmit, at a second time, a second signal to the array of optical devices such that the laser beam is not applied to the substrate at the second time, wherein the selected time interval is based on the first time and the second time.

18. The system of claim 17, wherein the array of optical devices include an array of reflective optical elements, wherein the array of reflective optical elements are configured to reflect the laser beam at the substrate at the first time and wherein the array of reflective optical elements are configured to reflect the laser beam at a laser beam absorbing device at the second time.

19. The system of claim 17, wherein the array of optical devices include an array of transmissive optical elements, wherein the array of transmissive optical elements are configured to transmit the laser beam at the substrate at the first time and wherein the array of transmissive optical elements are configured to transmit the laser beam at a laser beam absorbing device at the second time.

* * * * *